US009492766B2

(12) United States Patent
Marchesini

(10) Patent No.: US 9,492,766 B2
(45) Date of Patent: Nov. 15, 2016

(54) WASTEWATER TREATMENT PLANT

(71) Applicant: WAMGROUP S.P.A., Modena (IT)

(72) Inventor: Vainer Marchesini, San Prospero (IT)

(73) Assignee: WAMGROUP S.P.A., Modena (IT)

(*) Notice: Subject to any disclaimer, the term of this patent is extended or adjusted under 35 U.S.C. 154(b) by 180 days.

(21) Appl. No.: 14/374,322

(22) PCT Filed: Feb. 2, 2013

(86) PCT No.: PCT/IB2013/050891
§ 371 (c)(1),
(2) Date: Jul. 24, 2014

(87) PCT Pub. No.: WO2013/114340
PCT Pub. Date: Aug. 8, 2013

(65) Prior Publication Data

US 2014/0367327 A1 Dec. 18, 2014

(30) Foreign Application Priority Data

Feb. 2, 2012 (IT) .............................. BO2012A0046

(51) Int. Cl.
*B01D 21/02* (2006.01)
*B01D 21/26* (2006.01)
*B01D 21/00* (2006.01)
*C02F 1/00* (2006.01)

(52) U.S. Cl.
CPC ........... *B01D 21/26* (2013.01); *B01D 21/0042* (2013.01); *B01D 21/0063* (2013.01); *B01D 21/0075* (2013.01); *B01D 21/0087* (2013.01); *C02F 2001/007* (2013.01); *C02F 2301/02* (2013.01); *C02F 2301/028* (2013.01); *C02F 2303/24* (2013.01)

(58) Field of Classification Search
CPC .......... B01D 21/0039; B01D 21/0042; B01D 21/0063; B01D 21/0069; B01D 21/0075; B01D 21/0078; B01D 21/0087; B01D 21/2405; B01D 21/26; B01D 2021/0078; C02F 2301/02; C02F 2301/022; C02F 2301/028
USPC .............................. 210/519, 521, 532.1, 801
See application file for complete search history.

(56) References Cited

U.S. PATENT DOCUMENTS 1,104,051 A * 7/1914 Kropp .................. B01D 21/245
210/519
1,889,601 A * 11/1932 Heinkel ............. B01D 21/0087
210/532.1

(Continued)

FOREIGN PATENT DOCUMENTS

| DE | 11 42 798 | 1/1963 |
|---|---|---|
| DE | 196 45 733 | 5/1998 |
| EP | 2 251 072 | 11/2010 |

*Primary Examiner* — Christopher Upton
(74) *Attorney, Agent, or Firm* — Leason Ellis LLP

(57) ABSTRACT

A wastewater treatment plant. The plant comprises separating equipment for separating the solid particles from the liquid part. The separating equipment comprises, in turn, an inlet opening and an outlet opening, which are substantially arranged in line along a common directrix. In the fluid mass, there is present at least one fluid-dynamic profile, which is suited to help the detachment of the solid particles from the liquid part. The plant is characterized in that the separating equipment comprises, furthermore, a second fluid-dynamic profile. The two fluid-dynamic profiles define between one another a first preferential flow channel of the liquid mass.

18 Claims, 1 Drawing Sheet

(56) References Cited

U.S. PATENT DOCUMENTS

| | | | | | |
|---|---|---|---|---|---|
| 4,278,545 | A * | 7/1981 | Batutis | B01D 21/0075 | 210/521 |
| 4,985,148 | A * | 1/1991 | Monteith | B01D 17/00 | 210/519 |
| 5,470,489 | A | 11/1995 | Felder et al. | | |
| 6,062,767 | A * | 5/2000 | Kizhnerman | B01D 17/00 | 210/521 |
| 6,951,619 | B2 * | 10/2005 | Bryant | B01D 21/0042 | 210/519 |
| 7,300,588 | B2 * | 11/2007 | Broeders | B01D 21/2405 | 210/801 |
| 2009/0095672 | A1 | 4/2009 | Wilcher et al. | | |

* cited by examiner

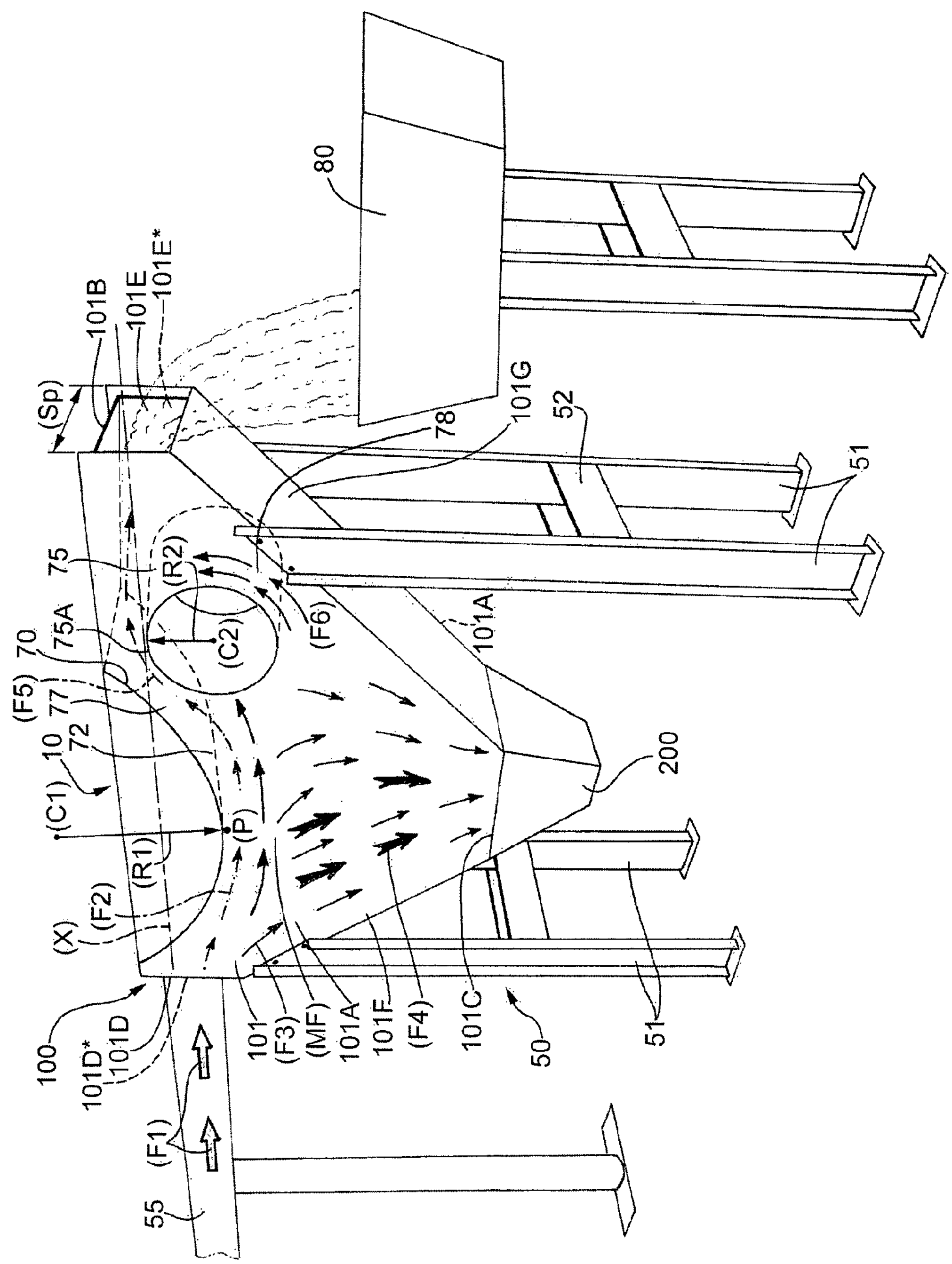
80
101B
101E
101E*
(Sp)
78
101G
52
51
75
(R2)
75A
70
(C2)
(F6)
101A
(F5)
77
10
72
(C1)
(P)
(R1)
(X)
(F2)
200
100
101D*
101D
101
(F3)
(MF)
101A
101F
(F4)
101C
50
51
(F1)
55

WASTEWATER TREATMENT PLANT

CROSS REFERENCE TO RELATED APPLICATIONS

The present application is a U.S. National Phase of International Patent Application PCT/IB2013/050891, filed Feb. 2, 2013, which claims priority to Italian Patent Application No. BO2012A000046 filed Feb. 2, 2012, each of which is incorporated herein by reference in its entirety.

TECHNICAL FIELD

The present invention relates to a wastewater treatment plant. In this plant the organic materials that rise to the surface of the liquid mass are separated from the solid inorganic materials that decant on the bottom.

In particular, the present invention can be advantageously, but not exclusively, applied in plants in which a liquid mass must be purified from the sand contained therein.

BACKGROUND ART

Plants currently present on the market are not very efficient with regard to the separation yield of the inorganic material, for example sand, from the fluid part.

DISCLOSURE OF INVENTION

The object of the present invention is, therefore, to produce a plant for separating at least one inorganic material from a fluid containing, furthermore, a certain quantity of suspended organic material that is easy to produce, while ensuring optimal performance in terms of general yields.

In other words, by means of the plant forming the object of the invention, adequate solid/liquid separation has been obtained, reducing both the size and the structural complexity of the plant, thus reaching a high degree of efficiency.

Therefore, according to the present invention there is produced a wastewater treatment plant as described in greater detail in the following description of the best mode of the invention and the accompany drawings.

The present plant comprises separating equipment for separating the solid particles from the fluid part;

wherein the separating equipment comprises, in turn, inlet means and outlet means, which are substantially arranged in line along a common directrix;

and wherein in the fluid mass, there is present, between the inlet means and the outlet means, at least one fluid-dynamic profile, which is suited to help the detachment of the solid particles from the liquid part;

the plant is characterised in that the separating equipment comprises, furthermore, a second fluid-dynamic profile; these two fluid-dynamic profiles defining between one another a first preferential flow channel of the liquid mass.

BRIEF DESCRIPTION OF THE DRAWING

For a better understanding of the present invention, there is now described a preferred embodiment, purely by way of non-limiting example and with reference to the single accompanying drawing.

In the single FIGURE, a wastewater treatment plant according to the present invention is indicated as a whole with 10.

BEST MODE FOR CARRYING OUT THE INVENTION

As will be seen in more detail hereunder, the plant 10 comprises separating equipment 100 for separating the solid particles from the fluid part.

The whole plant 10 is supported by a supporting structure 50 comprising a series of pillars 51 held together by a plurality of cross members 52. It is obvious that, in place of the supporting structure 50 shown in the FIGURE, it is possible to adopt any load-bearing structure suitable for the purpose.

The separating equipment 100 is supplied by a pipe 55 with wastewater that flows according to a direction and a sense indicated by an arrow (F1) substantially aligned with a horizontal axis (X). Normally, the wastewater treated in this type of plant is a mixture comprising a mass of water in which particles of organic waste, such as hydrocarbons, and inorganic substances, such as sand, are dispersed.

Analysing the separating equipment 100 in greater detail, it can be noted that it comprises a central tank 101 to which the pipe 55 is hydraulically connected.

In greater detail, it can be said that the faces of the central tank 101 comprise two lateral faces 101A, identical and facing one another, two horizontal base faces 10B, 10C, a vertical front (or inlet) face 101D, a vertical back (or outlet) face 101E and two inclined faces 101F, 101G, which, respectively, join the face 101D with the face 101C, and the face 101E once again with the face 101C.

All the faces 101B, 101C, 101D, 101E, 101F, 101G are rectangular, while each lateral face 101A of the central tank 101 has the shape of an irregular hexagon. The identical lateral faces 101A are arranged at a distance (Sp) from one another.

Ultimately, the faces 101B, 101C, 101D, 101E, 101F, 101G and the two identical lateral faces 101A define the central tank 101 in the shape of a flattened polyhedron with flat faces.

An opening 101D* for joining with the pipe 55 is produced on the face 101D. It is from this opening 101D* that the wastewater flows from the pipe 55 to the central tank 101. The face 101E has, in turn, an opening 101E* for outflow and discharge of at least a portion of the wastewater towards a collection container 80 thereof, or towards other similar evacuation means (not illustrated).

Furthermore, the two openings 101D* and 101E* are substantially aligned along the axis (X).

As also shown in the single FIGURE, a first fluid-dynamic profile 70, consisting of a substantially curvilinear three-dimensional surface, projects from the face 101B.

This surface, in the case in question, is a cylindrical sector with radius (R1) and centre (C1).

The wastewater coming from the pipe 55 entering the central tank 101 encounters the first fluid-dynamic profile 70 on its path inside the pre-existing fluid mass (MF). The inflowing fluid will tend to follow the contour of the first fluid-dynamic profile 70 with which it comes into contact if the curvature of the surface of this first fluid-dynamic profile 70, or if the angle of incidence of the flow with this surface, are not too accentuated. This phenomenon takes place also due to the “Coanda effect”.

The first fluid-dynamic profile 70 is suited to intercept an inlet stream tube produced at the inlet opening 101D*.

The second fluid-dynamic profile 75 is suited to intercept an inlet stream tube produced at the outlet opening 101E*.

It must be noted that, in the present context, “stream tube” is intended as a certain volume of fluid stream lines prevalently in laminar flow entering the central tank. As it is known, in "laminar flow" substantially all the fluid particles have a precise and concordant direction.

Furthermore, it has been found experimentally that, to obtain significant results in relation to the detachment of the solid particles from the liquid, it is important for the lower point (P) of the first fluid-dynamic profile 70 to be located below or, at most, "flush" with the lower surface of the pipe 55. This means that the mixed fluid flowing into the opening 101D* immediately encounters the aforesaid first fluid-dynamic profile 70.

As it is known, the "Coanda effect" is explained with the fact that the fluid moving along the surface causes friction that tends to slow it down. However, the resistance to movement of the fluid is only applied to the particles of fluid immediately in contact with the surface. The external particles of fluid, due to molecular interactions that tend to keep them joined to the internal particles, will therefore "rotate" on these, due to the difference in speed, thus causing the fluid to adhere to this surface.

Therefore, the suspended organic particles and a part of the fluid will tend to follow a preferential path 72 which goes from the opening 101D* to the opening 101E*, which, as stated, are substantially aligned along the axis (X). In particular, in the preferential path 72, the suspended organic particles will tend to follow a direction and a sense indicated by an arrow (F2), while a part of the entrainment fluid will flow downwards in a direction and a sense indicated by an arrow (F3).

However, it is obvious for those skilled in the art that, above all due to the pre-existence of the fluid mass (MF), not all the entrainment fluid and not all the organic particles will manage to move from the inlet opening 101D* to the outlet opening 101E*, but a limited portion thereof will be entrained downwards together with the heavier solid particles that move in directions and senses indicated by arrows (F4). However, the quantity of light organic particles that tend to move downwards is truly small, if compared to that of the organic particles which are entrained from the inlet opening 101D* to the outlet opening 101E*.

Progressive detachment of the solid particles will start at the beginning of the preferential path 72, and these particles will fall towards the bottom (face 101C) of the central tank 101, i.e. towards a collection hopper 200.

In a further embodiment of the invention, again shown in the FIGURE, in addition to the first fluid-dynamic profile 70, a second fluid-dynamic profile 75 has been added.

A portion 75A of the second fluid-dynamic profile 75 faces the first fluid-dynamic profile 70 and defines therewith a first preferential flow channel 77 (arrows (F5)) in the fluid mass (MF) of a part of the fluid enriched with the particles of organic material. In this case, the "Coanda effect" takes place both on the surface of the first fluid-dynamic profile 70, as stated above, and on the surface of the portion 75A of the second fluid-dynamic profile 75.

The second fluid-dynamic profile 75 consists of a substantially curved three-dimensional surface.

In this particular case, the second fluid-dynamic profile 75 is indicated by a right cylinder with circular base with radius (R2) with centre in (C2).

It must be noted that, in this particular case, the radius (R1) of the first fluid-dynamic profile 70 is greater than or equal to the radius (R2) of the second fluid-dynamic profile 75.

As can be noted, the second fluid-dynamic profile 75 is provided with a convexity opposed to that of the first fluid-dynamic profile 70.

The consequence of this design is that the preferential channel 77 has a wide inlet portion, which narrows at a certain point before widening once again towards the free surface of the liquid.

The wastewater containing the solid material that is more inclined to float will flow around the second fluid-dynamic profile 75 and along the first preferential channel 77 (arrows (F5)).

Instead, the wastewater containing the solid material that is on average heavier will flow more slowly around the second fluid-dynamic profile 75 along a second preferential channel 78 (arrows (F6)).

It must be noted that the second preferential channel 78 is defined, on one side, by the second fluid-dynamic profile 75 and, on the other, by the lateral face 101G of the central tank 101.

Therefore, a particular feature of the separating equipment 100 forming the main object of the present invention consists of the fact that it is provided with two preferential channels 77, 72, configured in a different manner from one another, which allow optimal separation both of the finest particles (preferably in the first preferential channel 77), and of the larger particles (preferably in the second preferential channel 78).

Thus, it must be noted that during this passage of the fluid in the second preferential channel 78 the heavier particles will become detached and will decant towards the bottom, while the flow of liquid will substantially be reunited with the other liquid flowing through the first preferential channel 77.

It is obvious for those skilled in the art that, besides the specific fluid dynamic profiles 70, 75, it is possible to use fluid-dynamic profiles of any shape and size on whose surfaces the physical conditions required to trigger the desired "Coanda effect" can be reproduced. In fact, the present invention originated from the study of flows around wing-shaped profiles, making use of fluid-dynamic fields to make the polluting particles follow predetermined paths. Therefore, at least one fluid-dynamic profile 70, 75 can be configured in the shape of an aircraft wing.

As stated previously, the solid particles fall from the separation device 100 into a collection hopper 200. During this fall, the solid particles are retained by the mesh of a horizontal sieve (not shown), arranged, for example, on the face 101C.

A device for evacuation of the solid particles, known and not represented, is arranged under the collection hopper.

Furthermore:

a) preferably, but not necessarily, the first fluid-dynamic profile 70 is arranged close to the inlet opening 101D*;

b) the first fluid-dynamic profile 70 consists of a concave surface with concavity that faces upwards;

c) preferably, but not necessarily, the second fluid-dynamic profile 75 is arranged close to the outlet opening 101E*;

d) at least one of the fluid-dynamic profiles 70, 75 is coated with a coating made of a plastic material to protect the fluid-dynamic profiles 70, 75 from the impacts of the solid particles; and e) the separating equipment 100 comprises a central tank 101 with the shape of a flattened polyhedron with substantially flat faces.

The main advantages of the plant described above are the following:

- due to the particular shape of the central tank in the shape of a flattened polyhedron with substantially flat faces and through the use of at least one fluid-dynamic profile, this establishes a fluid dynamic field such as to obtain separation between the substances, reducing both the volumes and the footprint of the plant; and it is possible to reduce the dimensions and the structural complexity of the plant, thereby obtaining high degrees of efficiency.

The invention claimed is:

1. A wastewater treatment plant (10); the plant (10) comprising separating equipment (100) for separating the solid particles from the liquid part;

wherein said separating equipment (100) comprises, in turn, inlet means (101D*) and outlet means (101E*), which are substantially arranged in line along a common directrix (X);

and wherein in the fluid mass (MF), there is present, between said inlet means (101D*) and said outlet means (101E*), at least one fluid-dynamic profile (70, 75) having a radius (R1), which is suited to help the detachment of the solid particles from the liquid part;

said plant being characterised in that said separating equipment (100) comprises, furthermore, a second fluid-dynamic profile (75) having a radius (R2), said two fluid-dynamic profiles (70, 75) defining between one another a first preferential flow channel (77) of the liquid mass, and said plant being further characterised in that a second preferential flow channel (78) is defined, on one side, by said second fluid-dynamic profile (75), and on the other, by a lateral face (101G) of a central tank (101).

2. The plant (10) according to claim 1, characterised in that said second fluid-dynamic profile (75) is provided with a convexity opposed to a convexity of said first fluid-dynamic profile (70).

3. The plant (10) according to claim 1, characterised in that said first fluid-dynamic profile (70) consists of a three-dimensional surface with a substantially curvilinear profile.

4. The plant (10) according to claim 1, characterised in that said second fluid-dynamic profile (75) is given by a right cylinder with circular base.

5. The plant (10) according to claim 4, characterised in that the radius (R1) of said fluid-dynamic profile (70) is greater than or equal to the radius (R2) of said second fluid-dynamic profile (75).

6. The plant (10) according to claim 1, characterised in that said first fluid-dynamic profile (70) is arranged close to said inlet means (101D*).

7. The plant (10) according to claim 1, characterised in that said second fluid-dynamic profile (75) is arranged close to said outlet means (101E*).

8. The plant (10) according to claim 1, characterised in that at least one of said fluid-dynamic profiles (70, 75) is coated with a coating made of a plastic material.

9. A wastewater treatment plant (10), the plant (10) comprising:

separating equipment (100) for separating the solid particles from the liquid part, wherein said separating equipment (100) comprises, in turn, an inlet means (101D*) and an outlet means (101E*), which are substantially arranged coaxially along an axis (X), a first fluid-dynamic profile (70, 75), arranged between said inlet means (101D*) and said outlet means (101E*), which is suited to help the detachment of the solid particles from the liquid part, and a second fluid-dynamic profile (75), arranged between said inlet means (101D*) and said outlet means (101E*), wherein said two fluid-dynamic profiles (70, 75) defining between one another a first preferential flow channel (77) such that at least a portion of the liquid part flows along a first convex shaped portion of the second fluid-dynamic profile (75), and wherein a second preferential flow channel (78) is defined, on one side, by said second fluid-dynamic profile (75) and, on the other, by a lateral face (101G) of a central tank (101) and at least a portion of the liquid part flows along a second convex shaped portion of the second fluid-dynamic profile (75).

10. The plant of claim 9, wherein the first and second preferential flow channels converge such that at least a portion of the liquid flowing along the first and second convex shaped portions converges prior to exiting the outlet.

11. The plant of claim 9, wherein the first and second fluid-dynamic profiles are convex relative to the first preferential flow channel, such that the first preferential flow channel has an inlet portion, an outlet portion, and a center portion located between the inlet and outlet portion, and the inlet and outlet portions are wider than the center portion.

12. The plant of claim 9, wherein the first preferential flow channel and the second preferential flow channel merger at their respective outlet portions.

13. The plant of claim 12, wherein in the first and second preferential flow channels direct the liquid part in the direction of the outlet.

14. The plant of claim 9, wherein said second fluid-dynamic profile (75) comprises a right cylinder having a circular base.

15. The plant of claim 14, wherein a radius of said first fluid-dynamic profile (70) is greater than or equal to a radius (R2) of said second fluid-dynamic profile (75).

16. The plant of claim 9, wherein said first fluid-dynamic profile (70) is arranged close to said inlet means (101D*) relative to said outlet means (101E*).

17. The plant of claim 9, wherein said second fluid-dynamic profile (75) is arranged close to said outlet means (101E*) relative to said inlet means (101D*).

18. A wastewater treatment plant (10); the plant (10) comprising separating equipment (100) for separating the solid particles from the liquid part; wherein said separating equipment (100) comprises, in turn, inlet means (101D*) and outlet means (101E*), which are substantially arranged in line along a common directrix (X); and wherein in the fluid mass (MF), there is present, between said inlet means (101D*) and said outlet means (101E*), at least one fluid-dynamic profile (70, 75) having a convexity, which is suited to help the detachment of the solid particles from the liquid part;

said plant being characterised in that said separating equipment (100) comprises, furthermore, a second fluid-dynamic profile (75), said two fluid-dynamic profiles (70, 75) defining between one another a first preferential flow channel (77) of the liquid mass and wherein said second fluid-dynamic profile (75) is provided with a first convexity opposed to a second convexity of said first fluid dynamic profile (70), said first preferential flow channel (77) being located between the first and second convexities; and said plant being further characterised in that a second preferential flow channel (78) is defined, on one side, by said second fluid-dynamic profile (75) and, on the other, by a lateral face (101G) of a central tank (101).

* * * * *